(12) United States Patent
Tavenrath

(10) Patent No.: US 8,379,022 B2
(45) Date of Patent: Feb. 19, 2013

(54) FRAGMENT SHADER FOR A HYBRID RAYTRACING SYSTEM AND METHOD OF OPERATION

(75) Inventor: Markus Tavenrath, Wuerselen (DE)

(73) Assignee: NVIDIA Corporation, Santa Clara, CA (US)

( * ) Notice: Subject to any disclaimer, the term of this patent is extended or adjusted under 35 U.S.C. 154(b) by 1030 days.

(21) Appl. No.: 12/238,661

(22) Filed: Sep. 26, 2008

(65) Prior Publication Data

US 2010/0079457 A1    Apr. 1, 2010

(51) Int. Cl.
*G06T 15/60*    (2006.01)
(52) U.S. Cl. ........................................................ 345/426
(58) Field of Classification Search .................. 345/426
See application file for complete search history.

(56) References Cited

U.S. PATENT DOCUMENTS

| | | | |
|---|---|---|---|
| 6,621,925 | B1 | 9/2003 | Ohmori et al. |
| 7,289,119 | B2 | 10/2007 | Heirich et al. |
| 2006/0256112 | A1* | 11/2006 | Heirich et al. ................ 345/427 |
| 2007/0035544 | A1* | 2/2007 | Fossum et al. ................ 345/422 |
| 2007/0035545 | A1* | 2/2007 | Hempel et al. ................ 345/422 |
| 2010/0315423 | A1* | 12/2010 | Ahn et al. ..................... 345/426 |

FOREIGN PATENT DOCUMENTS

| | | |
|---|---|---|
| WO | 2006049870 A1 | 5/2006 |
| WO | 2007017391 A1 | 2/2007 |
| WO | 2007070456 A2 | 6/2007 |

OTHER PUBLICATIONS

German Office Action Summary (with English translation) from application No. 10 2009 037 288.1-53 dated Apr. 1, 2010.
Philippe C.D. Robert et al.: Hybrid Ray Tracing, Ray Tracing Using GPU-Accelerated Image Space Methods Proceedings of GRAPP 2007, Apr. 25, 2007, 7 pages & bibliography; eHB.
Marc Levoy:"A Hybrid Ray Tracer for Rendering Polygon and Volume Data" University of North Carolina, Mar. 1990, IEEE Xplore, pp. 33 to 40; eHB.
Notice of Preliminary Rejection from Korean Application No. 10-2009-91137 dated Mar. 1, 2011.
Chinese Office Action from Application No. 200910176688.8 dated May 18, 2011.
Examination Report and Invitation to Attend Oral Proceedings from German Patent Application No. 10 2009 037 288.1, dated Oct. 4, 2011.
Notice of Reasons for Rejection from Japanese Patent Application No. 2009-189947, dated Jul. 5, 2011.
Decision to Grant from Japanese Patent Application No. 2009-189947, dated Nov. 1, 2011.
Notice of Allowance from Korean Patent Application No. 10-2009-0091137, dated Sep. 26, 2011.
Office Action from Chinese Patent Application No. 200910176688.8, dated Mar. 31, 2012.
Notice of Grant of Patent Right for Invention from Chinese Patent Application No. 200910176688.8, dated Aug. 31, 2012 (translation only).

* cited by examiner

*Primary Examiner* — James A Thompson
*Assistant Examiner* — Wynton S Jones
(74) *Attorney, Agent, or Firm* — Zilka-Kotab, PC

(57) ABSTRACT

A fragment shader and method of operation are provided for a hybrid ray tracing system. The method includes determining whether a fragment is to be rasterized or raytraced. If a determination is made that the fragment is to be rasterized, a predetermined value for the fragment is stored into a rasterization target, the predetermined value indicating that the fragment is to be excluded from raytracing operations. If a determination is made that the fragment is to be raytraced, a primitive identifier of the fragment is stored into a rasterization target.

21 Claims, 4 Drawing Sheets

FRAGMENT SHADER FOR A HYBRID RAYTRACING SYSTEM AND METHOD OF OPERATION

FIELD OF THE INVENTION

The present invention relates to hybrid raytracing operations, and more particularly to a fragment shader for a hybrid raytracing system and its method of operation.

BACKGROUND

Hybrid raytracing is known in the art as a combined process of rasterizaton and raytracing. Initially, fragments, e.g., pixels, which do not include any reflective or refractive surfaces are rasterized. A raytracing operation is subsequently performed for the pixels which include reflective or refractive surfaces. Within the raytracing operation, the primary ray is typically skipped, and a secondary ray is generated from the intersected surface point which is used to calculate a reflection or refraction for the rendered image. The rasterized and raytraced images are blended or merged to form a composite image.

Within the initial rasterization process, two rasterization operations are performed. In a first operation, the pixels which are not to be raytraced are rasterized. In a second operation, the primitive identifiers for the pixels are rasterized. This two step rasterization process delays the generation of the rasterized image, and rendering of the overall composite image.

Accordingly, what is needed is a system and method for reducing rasterization delay in hybrid raytracing systems.

SUMMARY

A fragment shader and method of operation are provided for a hybrid ray tracing system. The method includes determining whether a fragment is to be rasterized or raytraced. If a determination is made that the fragment is to be rasterized, a predetermined value for the fragment is stored into a rasterization target, the predetermined value indicating that the fragment is to be excluded from raytracing operations. If a determination is made that the fragment is to be raytraced, a primitive identifier of the fragment is stored into a rasterization target.

These and other features will be better understood in view of the following drawings and detailed description of exemplary embodiments.

DETAILED DESCRIPTION OF DETAILED EMBODIMENTS

Figure 1:
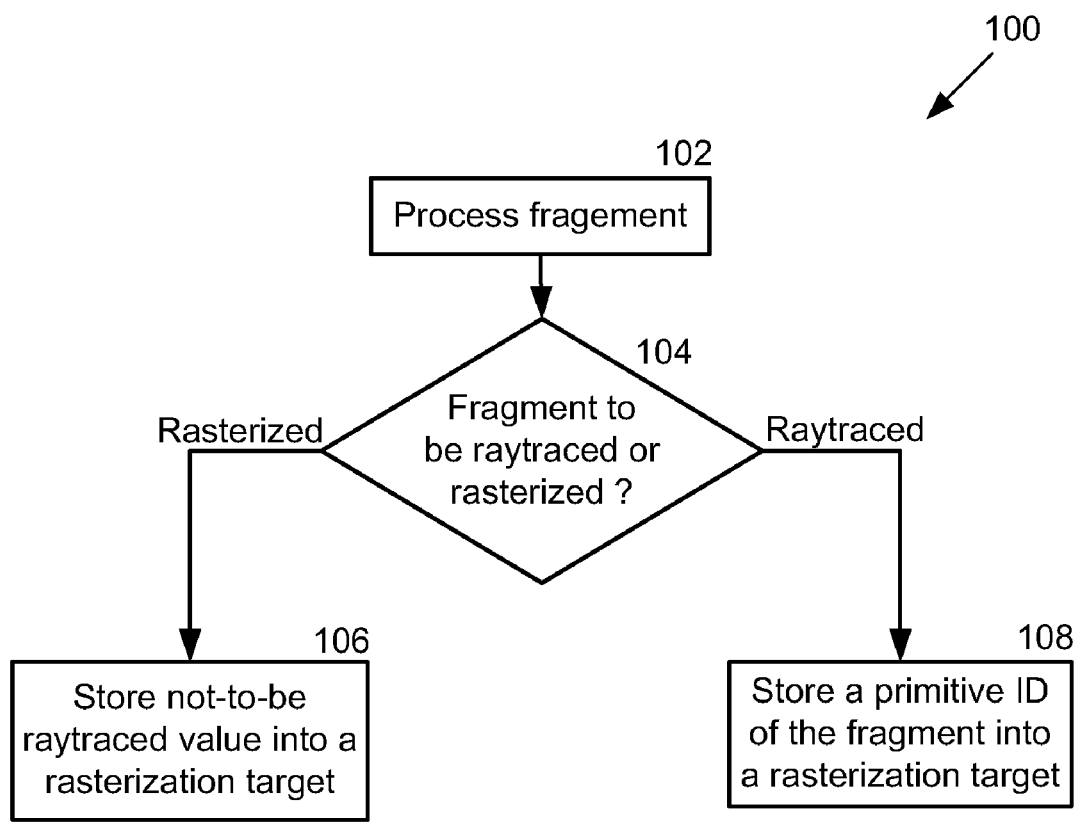
FIG. 1 illustrates an exemplary fragment shading process in accordance with one embodiment of the present invention.

FIG. 1 illustrates an exemplary fragment shading process 100 in accordance with one embodiment of the present invention. The method process includes determining whether a fragment (e.g., a pixel) is to be rasterized or intersected by one or more primary rays (a process referred to herein as "raytraced"), and applying subsequent processing to the fragment accordingly based upon this determination. As used herein, the term rasterized refers to any technique for converting a color value or vector into a raster format. Further herein, the term "raytracing operations" refer to raytracing operations involving the intersection of a fragment by one or more primary rays, as is known in the art of hybrid raytracing.

At 102, fragment processing begins and at 104, a determination is made as to whether the fragment is to be rasterized or raytraced. If the determination is made that the fragment is to be included in rasterization operations, at 106 a predetermined value is generated and stored into a rasterization target, the predetermined value indicating that the fragment is not to be raytraced. In one embodiment, the predetermined value generated by operation 106 is a value of −1, although any value or indicia may be used to indicate that the fragment is to be excluded from raytracing operations in accordance with the present invention. In a particular embodiment operation 106, the fragment is assigned a "raytraced attribute" having either a true or false state, the false state indicated by a predetermined value (e.g., −1) identifying the fragment as not to be raytraced.

If at 104, a determination is made that the fragment is to be raytraced, a primitive identifier of the fragment is stored into a rasterization target for the fragment at 108. For example, if the fragment includes triangle primitives, process 108 includes storing a triangle ID into a rasterization target (e.g., a triangle ID buffer) for the fragment. Those skilled in the art will appreciate that different geometric primitives may be included within a fragment, e.g., polygons, spheres, lines, points, etc., and any identifier of such primitives may be stored in within a rasterization target corresponding thereto in accordance with the present invention. It will be further understood that one or any number of fragments may be combined to form a pixel, as known in the art.

The determination at 104 may be made using any technique for distinguishing between rasterization and raytracing operations. For example, if the fragment is determined to be within a reflected or refracted surface, the fragment may be determined to be included within raytracing operations. Those skilled in the art will appreciate that other metrics may be applied to determining whether the fragment is to be included in rasterization or raytracing operations.

Figure 2:
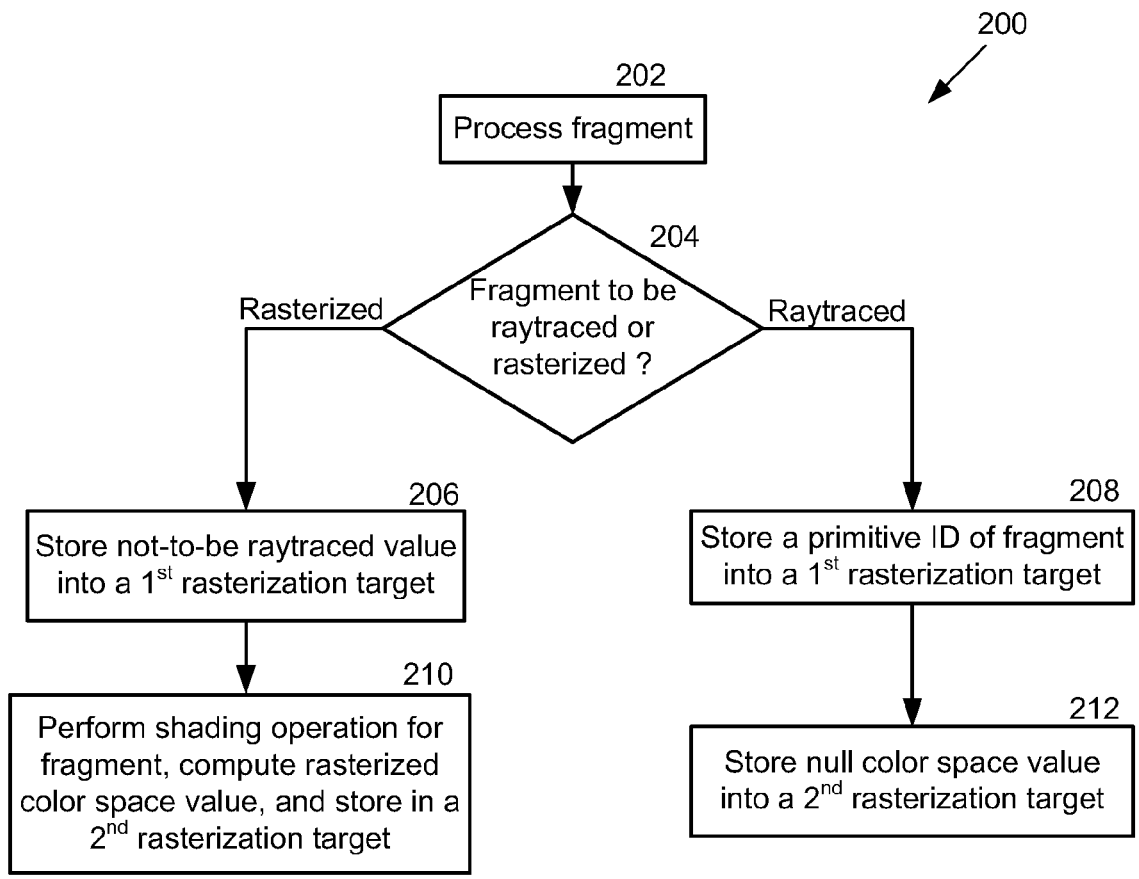
FIG. 2 illustrates an exemplary fragment shading process which incorporates the fragment shading process of FIG. 1 in accordance with one embodiment of the present invention.

FIG. 2 illustrates an exemplary fragment shader process which incorporates the fragment shading process of FIG. 1 in accordance with one embodiment of the present invention. Operations 202-208 parallel operations 102-108 of FIG. 1. At 202, fragment processing begins, and at 204, a determination is made as to whether the selected fragment is to be rasterized or raytraced. If the determination is made that the fragment is to be included in rasterization operations, at 206 a predetermined value is generated and stored into a first rasterization target, the predetermined value indicating that the fragment is not to be raytraced. If at 204, a determination is made that the fragment is to be raytraced, a primitive identifier of the fragment is stored into a first rasterization target for the fragment at 208. In practice, a third possibility also exists, in which the selected fragment is to be neither rasterized, nor raytraced. During rasterization, for example, a shader may decide to discard the fragment. If the current primitive is not marked as being raytraced and is discarded by the shader for rasterization, the color value remains unchanged. Primitive identifiers may be implemented as a vertex attribute. In this instance, the primitive may be specified as a uniform for the fragment shader per primitive. Alternatively, the first primitive identifier of a series of primitives is specified as a uniform for a geometry shader. The geometry shader can then generate subsequent primitive identifiers per primitive.

Further exemplary in the condition in which the fragment is to be rasterized, method 200 further includes operation 210 in which a shading operation is invoked for the selected fragment, whereby a rasterized color value for the fragment is computed and stored into a second rasterization target (e.g., a color buffer) for the fragment. Any shading operation can be implemented in accordance with this operation.

Further exemplary in the condition in which the fragment is to be raytraced, method 200 further includes operation 212 in which a null color space value is stored into a second rasterization target (e.g., a color buffer) for the fragment. In a particular embodiment, the null color space value is a color value of RGBA (0, 0, 0, 0), i.e., fully transparent black. Selection of such a color space value facilitates compositing of the rasterized and raytraced fragments to generate a final frame, as not-rasterized fragments and not-raytraced fragments will render as black background. However, those skilled in the art will appreciate that different null color space values (and/or a different color space format) may be implemented in accordance with a different compositing schemes. In a particular embodiment, the fragment shader 200 is called once per primitive included within the fragment. For example, operations 202-212 may be performed for each of N triangles included within a pixel to which the fragment shader 200 is assigned. Further exemplary, operations 202-212 may be performed up to N times for each fragment if N triangles cover this fragment.

As will be appreciated, some of the fragments will be selected for rasterization in the hybrid raytracing operation, and some will be selected for raytracing. Accordingly, a sequence of the operations 202, 204, 206 and 210, in which a first fragment is prepared for rasterization may be performed prior to (or subsequent to) a sequence of the operations 202, 204, 208 and 212, in which a second fragment is prepared for raytracing. In this manner, a plurality of fragments (e.g., all of the fragments within a frame) is processed for rasterization or raytracing in the hybrid raytracing operation, as further described herein.

Figure 3:
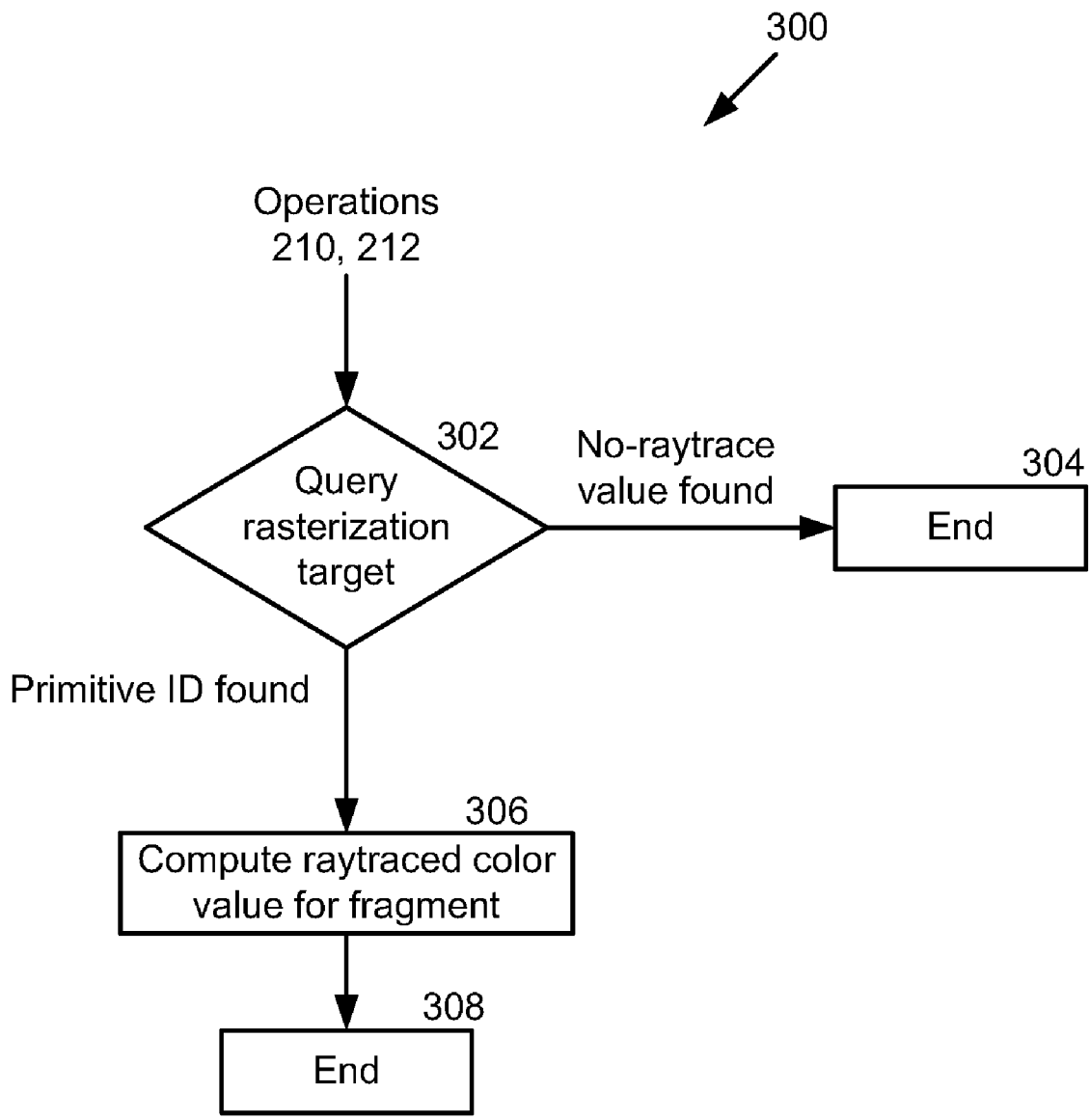
FIG. 3 illustrates an exemplary hybrid raytracing method which incorporates the fragment shading processes of FIGS. 1 and 2 in accordance with one embodiment of the present invention.

FIG. 3 illustrates an exemplary hybrid raytracing method (or "raytracer") which incorporates the fragment shading processes of FIGS. 1 and 2 in accordance with one embodiment of the present invention. According to this method, rasterization of primitives is employed to locate the viewable (i.e., nearest nearplane) fragment, and shading is performed to compute a color value for the fragment. The raytracer 300 omits the first raytracing step, as traversal operations for the primary rays normally included in the raytracing algorithm are replaced by the rasterization step, as further explained below. All further traversal steps are done by the raytracer as usual.

The method 300 represents a continuation of method 200 in which a particular fragment has been rasterized, either in terms of its color value (operation 210), or in terms of the fragment's primitive identifier (operation 208). At 302, the fragment is queried to determine if it is to be raytraced. In a particular embodiment, one or both of the rasterization targets is queried to determine if it stores the not-to-be raytraced value, as noted above. In another embodiment, the rasterization targets are searched for the presence of a primitive identifier, which would indicate the fragment is to be raytraced. In an exemplary embodiment of this process, the triangle ID buffer of the fragment is supplied to a raytracing engine for processing, either for detecting the presence/absence of the not-to-be raytraced value or for detecting the presence/absence of a primitive identifier.

If the determination at 302 is that the fragment is not to be raytraced (e.g. a no-raytrace value is found for the fragment), the method concludes at 304. If the determination at 302 is that the fragment is to be raytraced (e.g., a primitive identifier is found, or via the absence of the no-raytrace value for the fragment), the method continues at 306, where the raytracer performs intersection and shading operations. Further particularly, traversal operations, usually performed as a part of raytracing operations, are omitted, as operation 208 provides this data, i.e., the primitive identifier specifies the primitive which is intersected by the ray for the subject fragment. The data provided by operation 208 is used by the raytracer 300 to compute the intersection of a ray with geometry, and to compute the raytraced color space value for the fragment. As process 208 will typically operate significantly faster to identify the nearest nearplane fragment in comparison to the logarithmic search employed in a raytracing traversal operation (for example, in a scene containing 10,000 triangles), the method of the present invention provides increased speed and computational efficiencies in rendering over the conventional methods.

In a particular embodiment, the hybrid raytracer 300 is called once per visible fragment of the image. In such an instance, operations 302-308 are performed on a per fragment basis, and a raytraced color value (if any, per the conditional operation 304) is computed for each fragment once. Further exemplary, the operations of 204, 206, and 210 may be called to provide a first fragment having a rasterized color space value as defined above, and operations 204, 208, 212, 302 and 306 may be repeated to provide a second fragment, each having a raytraced color value, as defined above. A composite image of the two fragments can be obtained by combining (blending, merging, or adding, for example) the fragments. Fragments which are neither rasterized nor raytraced remain in the background color, e.g., fully transparent black RGBA (0, 0, 0, 0) in one exemplary embodiment.

As can be seen from FIG. 3, the hybrid raytracer is operable to call and execute the user's fragment shader program in operation 210, while also operable to provide primitive identifiers for fragments which are to be raytraced (operation 208). The user is thus able to rasterization the scene as needed, and can query the triangle ID buffer afterwards (operation 304) for subsequent raytracing operations (operation 306). In this manner, the hybrid raytracer 300 provides transparent processing of both fragment types to the user. Furthermore, rasterization of the each fragment type occurs only once, either by means of operations 206 and 210 for rasterized color space value fragments, or by means of operations 208 and 212 for raytraced color space value fragments. The operations in methods 100, 200 and 300 may each be implemented as executable instructions in any suitable programming language, a few examples being OpenGL Shading Language (GLSL), Cg Shading Language, High Level Shader Language (HLSL), or the Compute Unified Device Architecture (CUDA™) GPU programming language for use with respective compilers of such languages. Additionally, the illustrated operations may be carried out by means of hardware or firmware, for example, by means of an Application Specific Integrated Circuitry (ASIC), a Programmable Logic Array (PLA), a Field-Programmable Gate Array (FPGA), or other such devices.

Figure 4:
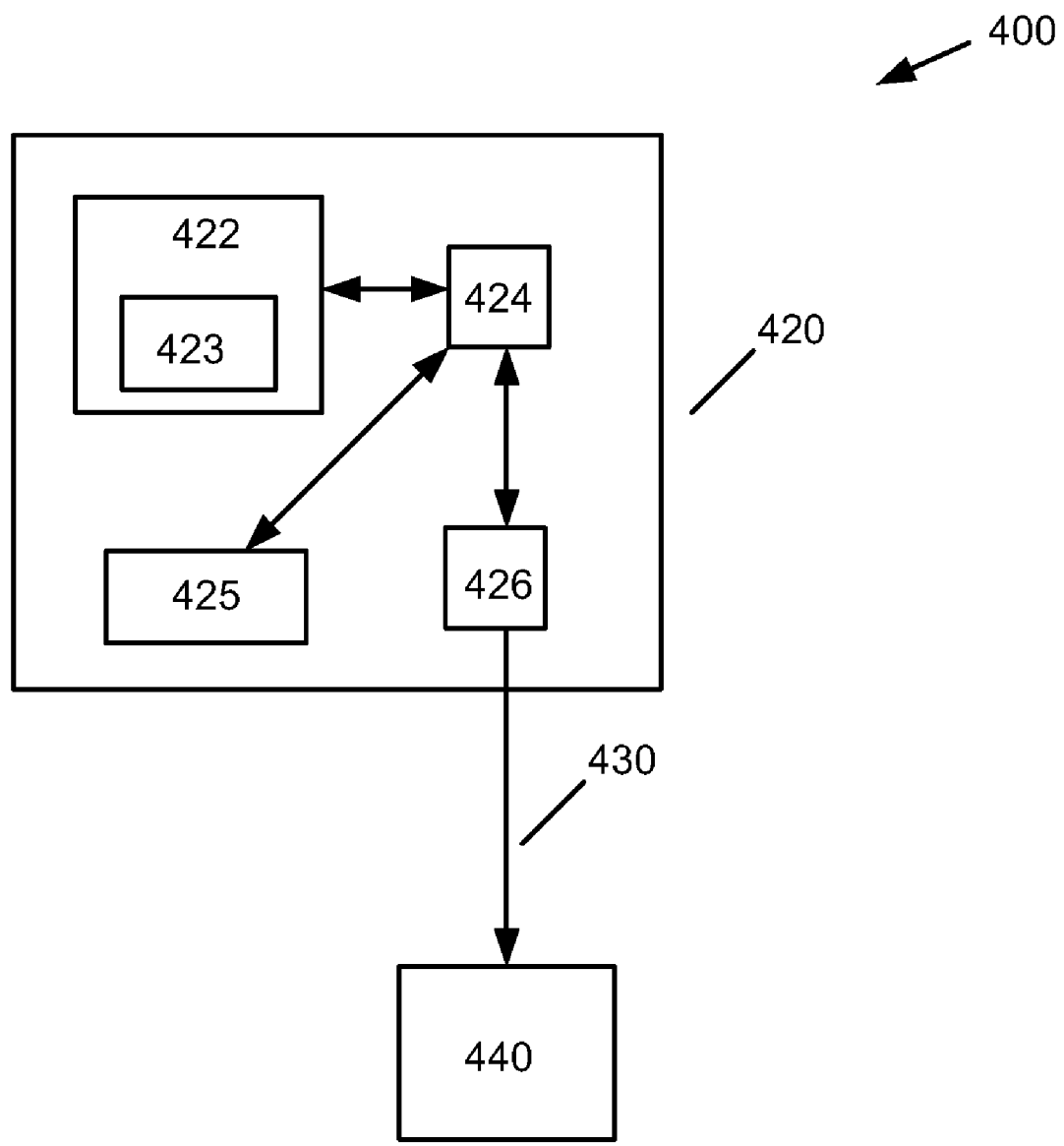
FIG. 4 illustrates an exemplary system in which the methods of FIGS. 1-3 find utility in accordance with the present invention.

FIG. 4 illustrates an exemplary system 400 in which the methods of FIGS. 1-3 finds utility in accordance with the present invention. The system 400 includes a graphics processing sub-system 420 and an output device 440, such as a monitor or printer. The graphics processing sub-system 420 includes a processor 422, a memory interface 424, a frame buffer 425, and a scanout processor 426. The processor 422 includes a shader module 423 operable to perform any or all of the operations illustrated in FIGS. 1-3 herein. A frame buffer 426 is operably coupled to the processor 422 for receiving rasterized and raytraced fragment values for each frame, and for reading out a composite image of each frame to the output device 440 via memory interface 424 and link 430 (e.g., a DVI link).

In a specific embodiment, the shader module 423 is operable to store instruction code for performing the fragment shader programs 100 and 200 of FIGS. 1 and 2, respectively. In one embodiment, the fragment shading module 423 includes means for performing operations 104-08 and 204-208, in which a fragment is determined to be rasterized or raytraced, storing a predetermined value for the fragment into a rasterization target if the fragment is to be rasterized, the predetermined value indicating that the fragment is to be excluded from raytracing operations, and storing a primitive identifier of the fragment into a rasterization target if the fragment is to be raytraced. The fragment shading module 423 further includes means for performing the operations 206 and 210, in which a shading operation for the fragment to is performed to compute a rasterized color value of the fragment, and to store the rasterized color value of the fragment into a second rasterization target. The fragment shading module 423 further includes means for storing a null color value to a second rasterization target. The fragment shading module may also include means for performing hybrid raytracing operations 302-306 shown in FIG. 3 and described herein.

As readily appreciated by those skilled in the art, the described processes and operations may be implemented in hardware, software, firmware or a combination of these implementations as appropriate. In addition, some or all of the described processes and operations may be implemented as computer readable instruction code resident on a computer readable medium, the instruction code operable to control a computer of other such programmable device to carry out the intended functions. The computer readable medium on which the instruction code resides may take various forms, for example, a removable disk, volatile or non-volatile memory, etc., or a carrier signal which has been impressed with a modulating signal, the modulating signal corresponding to instructions for carrying out the described operations.

In a particular embodiment of the invention, a memory is operable to store instructions for performing any of the operations illustrated in FIGS. 1, 2 and 3. The memory may take various forms, e.g., a removable disk, an embedded memory, etc., in volatile or non-volatile form, and may be included within a variety of different systems, e.g. a computer system, an embedded processor, a graphics processor, or graphics processing sub-system, such as a graphics card.

The terms "a" or "an" are used to refer to one, or more than one feature described thereby. Furthermore, the term "coupled" or "connected" refers to features which are in communication with each other, either directly, or via one or more intervening structures or substances. The sequence of operations and actions referred to in method flowcharts are exemplary, and the operations and actions may be conducted in a different sequence, as well as two or more of the operations and actions conducted concurrently. Reference indicia (if any) included in the claims serves to refer to one exemplary embodiment of a claimed feature, and the claimed feature is not limited to the particular embodiment referred to by the reference indicia. The scope of the clamed feature shall be that defined by the claim wording as if the reference indicia were absent therefrom. All publications, patents, and other documents referred to herein are incorporated by reference in their entirety. To the extent of any inconsistent usage between any such incorporated document and this document, usage in this document shall control.

The foregoing exemplary embodiments of the invention have been described in sufficient detail to enable one skilled in the art to practice the invention, and it is to be understood that the embodiments may be combined. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined solely by the claims appended hereto.

What is claimed is:

1. A method, comprising:
   determining that a first fragment is to be rasterized, and in response to the determination that the first fragment is to be rasterized:
      storing a predetermined value for the first fragment into a first rasterization target, the predetermined value indicating that the first fragment is to be excluded from raytracing operations,
      performing a shading operation for the first fragment to compute a rasterized color value of the first fragment, and
      storing the rasterized color value of the first fragment to a second rasterization target;
   determining that a second fragment is to be raytraced, and in response to the determination that the second fragment is to be raytraced:
      storing a primitive identifier of the second fragment into a third rasterization target,
      storing a null color value to a fourth rasterization target for the second fragment, and
      computing a raytraced color value for the second fragment, using the primitive identifier of the second fragment stored in the third rasterization target; and
   once the first fragment is rasterized and the second fragment is raytraced, compositing the first fragment and the second fragment to generate a final frame;
   wherein the null color value stored to the fourth rasterization target facilitates the compositing of the first fragment and the second fragment to generate the final frame.

2. The method of claim 1, further comprising:
   querying the first rasterization target; and
   excluding the first fragment from raytracing operations based upon the predetermined value stored in the first rasterization target.

3. The method of claim 1, further comprising:
   querying the third rasterization target; and
   computing a raytraced color value for the second fragment based upon the primitive identifier stored in the third rasterization target.

4. The method of claim 3, wherein computing the raytraced color value for the second fragment comprises using the primitive identifier of the second fragment stored in the third rasterization target as data for primary rays of a raytracing operation.

5. The method of claim 1, further comprising:
   for a third fragment which is to be raytraced, performing the operations of:

storing a primitive identifier of the third fragment into a fifth rasterization target;
storing the null color value into a sixth rasterization target; and
computing a raytraced color value for the third fragment; and
wherein the first fragment and the second fragment are further composited with the third fragment to generate the final frame.

6. A non-transitory computer readable medium storing instruction code to:
determine that a first fragment is to be rasterized, and in response to the determination that the first fragment is to be rasterized:
store a predetermined value for the first fragment into a first rasterization target, the predetermined value indicating that the first fragment is to be excluded from raytracing operations,
perform a shading operation for the first fragment to compute a rasterized color value of the first fragment, and
store the rasterized color value of the first fragment to a second rasterization target;
determine that a second fragment is to be raytraced, and in response to the determination that the second fragment is to be raytraced:
store a primitive identifier of the second fragment into a third rasterization target,
store a null color value to a fourth rasterization target for the second fragment, and
compute a raytraced color value for the second fragment, using the primitive identifier of the second fragment stored in the third rasterization target; and
composite the first fragment and the second fragment to generate a final frame once the first fragment is rasterized and the second fragment is raytraced;
wherein the computer program is operable such that the null color value stored to the fourth rasterization target facilitates the compositing of the first fragment and the second fragment to generate the final frame.

7. The non-transitory computer readable medium of claim 6, further storing instruction code to:
query the first rasterization target; and
exclude the first fragment from raytracing operations based upon the predetermined value stored in the first rasterization target.

8. The non-transitory computer readable medium of claim 6, further storing instruction code to:
query the third rasterization target; and
compute a raytraced color value for the second fragment based upon the primitive identifier stored in the third rasterization target.

9. The non-transitory computer readable medium of claim 8, wherein the instruction code to compute the raytraced color value for the second fragment comprises instruction code to use the primitive identifier of the second fragment stored in the third rasterization target as data for primary rays of a raytracing operation.

10. The non-transitory computer readable medium of claim 6, further storing:
instruction code to perform, for a third fragment which is to be raytraced, the operations of:
storing a primitive identifier of the third fragment into a fifth rasterization target;
storing the null color value into a sixth rasterization target; and
computing a raytraced color value for the second fragment;
wherein the first the first fragment and the second fragment are further composited with the third fragment to generate the final frame.

11. A system, comprising:
a fragment shading module that:
determines that a first fragment is to be rasterized, and in response to the determination that the first fragment is to be rasterized:
stores a predetermined value for the first fragment into a first rasterization target, the predetermined value indicating that the first fragment is to be excluded from raytracing operations,
performs a shading operation for the first fragment to compute a rasterized color value of the first fragment, and
stores the rasterized color value of the first fragment to a second rasterization target;
determines that a second fragment is to be raytraced, and in response to the determination that the second fragment is to be raytraced:
stores a primitive identifier of the second fragment into a third rasterization target,
stores a null color value to a fourth rasterization target for the second fragment, and
computes a raytraced color value for the second fragment, using the primitive identifier of the second fragment stored in the third rasterization target; and
composites the first fragment and the second fragment to generate a final frame once the first fragment is rasterized and the second fragment is raytraced;
wherein the system is operable such that the null color value stored to the fourth rasterization target facilitates the compositing of the first fragment and the second fragment to generate the final frame.

12. The system of claim 11, where the fragment shading module:
queries the first rasterization target; and
excludes the first fragment from raytracing operations based upon the predetermined value stored in the first rasterization target.

13. The system of claim 11, the where the fragment shading module:
queries the third rasterization target; and
computes a raytraced color value for the second fragment based upon the primitive identifier stored in the third rasterization target.

14. The system of claim 13, wherein computing the raytraced color value for the second fragment comprises using the primitive identifier of the second fragment stored in the third rasterization target as data for primary rays of a raytracing operation.

15. The system of claim 11, wherein, for a third fragment which is to be raytraced, the fragment shading module:
stores a primitive identifier of the third fragment into a fifth rasterization target;
stores the null color value into a sixth rasterization target; and
computes a raytraced color value for the third fragment;
wherein the first the first fragment and the second fragment are further composited with the third fragment to generate the final frame.

16. The method of claim 1, wherein for the second fragment to be raytraced, the primitive identifier of the second fragment stored into the third rasterization target is utilized to compute the intersection of a ray, and to compute a raytraced color space value for the second fragment.

17. The method of claim 5, wherein the composited final frame of the first fragment, the second fragment, and the third fragment is obtained by at least one of blending, merging, and adding the first fragment, the second fragment, and the third fragment.

18. The method of claim 1, wherein the null color value, stored to the fourth rasterization target in response to the determination that the second fragment is to be raytraced, is a color value of RGBA (0, 0, 0, 0).

19. The method of claim 1, wherein the null color value, stored to the fourth rasterization target, in response to the determination that the second fragment is to be raytraced, is a fully transparent black.

20. The method of claim 1, wherein for each of the fragments a fragment shader is called once per primitive included within the fragment for determining whether the primitive is to be rasterized or raytraced, such that the determination that the fragment is to be rasterized or the determination that the fragment is to be raytraced is performed for each primitive included within the fragment to which the fragment shader is assigned.

21. The method of claim 1, wherein for each of the fragments a fragment shader is called once per primitive included within the fragment for determining whether the primitive is to be rasterized or raytraced, such that the determination that the fragment is to be rasterized or the determination that the fragment is to be raytraced is performed up to a number of times for the fragment, wherein the number of times is a number of primitives that cover the fragment.

* * * * *